United States Patent
Sharnoff et al.

(10) Patent No.: US 6,314,421 B1
(45) Date of Patent: *Nov. 6, 2001

(54) METHOD AND APPARATUS FOR INDEXING DOCUMENTS FOR MESSAGE FILTERING

(75) Inventors: David Muir Sharnoff, Oakland; Matthew D. Dillon, Berkeley, both of CA (US)

(73) Assignee: David M. Sharnoff, Oakland, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/076,757

(22) Filed: May 12, 1998

(51) Int. Cl.$^7$ .................................................. G06F 17/30
(52) U.S. Cl. ............................. 707/5; 707/100; 709/201
(58) Field of Search ..................... 707/5, 6, 3–4, 707/100–102; 704/2, 7, 9, 10; 380/29, 37, 42, 28; 709/201

(56) References Cited

U.S. PATENT DOCUMENTS

| | | | |
|---|---|---|---|
| 5,107,419 | 4/1992 | MacPhail | 395/600 |
| 5,204,958 | 4/1993 | Cheng et al. | 395/600 |
| 5,276,741 | 1/1994 | Aragon | 382/40 |
| 5,276,869 | 1/1994 | Forrest et al. | 395/600 |
| 5,375,235 | 12/1994 | Berry et al. | 395/600 |
| 5,418,951 | 5/1995 | Damashek | 395/600 |
| 5,469,354 | 11/1995 | Hatakeyama et al. | 364/419.19 |
| 5,479,654 | * 12/1995 | Squibb | 707/200 |
| 5,613,108 | 3/1997 | Morikawa | 393/616 |
| 5,659,771 | * 8/1997 | Golding | 704/9 |
| 5,701,459 | 12/1997 | Millett et al. | 395/603 |
| 5,724,593 | * 3/1998 | Hargrove, III et al. | 707/5 |
| 5,745,899 | * 4/1998 | Burrows | 707/102 |
| 5,754,938 | * 5/1998 | Herz et al. | 455/4.2 |
| 5,764,899 | * 6/1998 | Eggleston et al. | 709/213 |
| 5,991,714 | * 11/1999 | Shaner | 704/9 |
| 6,105,023 | * 8/2000 | Callan | 707/5 |

OTHER PUBLICATIONS

Microsoft Press Computer Dictionary, 2nd edition, Dec. 1994, p. 100 "CRC".*
International Search Report, PCT/US 99/10627, 6 pages.
Marti A. Hearst, "Multi–Paragraph Segmentation Of Expository Text", 32nd Annual Meeting Of the Association For Computational Linguistics, Jun. 1994, pp. 9–16.
Marti A. Hearst, "TextTiling: Segmenting Text Into Multi–Paragraph Subtopic Passages", Computational Linguistics, Mar. 1997, vol. 23, No. 1, pp. 33–64.

* cited by examiner

*Primary Examiner*—Hosain T. Alam
(74) *Attorney, Agent, or Firm*—Blakely, Sokoloff, Taylor & Zafman LLP

(57) ABSTRACT

A method and apparatus for a document filtering mechanism is provided. A document indexing mechanism is described. A first document is parsed into elements, and a deterministic pseudo-random score is calculated for at least some of the elements. A subset of the scores is selected based on the values of the scores. The subset of the scores is used as multiple indexes into a database of documents.

25 Claims, 7 Drawing Sheets

US 6,314,421 B1

METHOD AND APPARATUS FOR INDEXING DOCUMENTS FOR MESSAGE FILTERING

FIELD OF THE INVENTION

The present invention relates to document indexing, and more specifically, to approximate, content-based classification of documents.

BACKGROUND

There has been a great deal of work on automatic content-based document search techniques and document classifiers for various applications. Some examples of prior art document classification mechanisms are listed below.

In U.S. Pat. No. 5276741, entitled "Fuzzy string matcher," an algorithm compares strings into which error has been introduced, using a measure of approximate similarity. However, the types of errors introduced do not include different orderings of the original message.

In U.S. Pat. No. 5375235, entitled "Method of indexing keywords for searching in a database recorded on an information recording medium," the matching technique employs a similarity measure, based on keyword-frequency. Knowledge of likely keywords on the part of the sending parties will lead them away from such word choices when they want to present the information against the wishes of the receiver. Therefore, this method can not be used against knowing senders who want to avoid matching.

In U.S. Pat. No. 5418951, entitled "Method of retrieving documents that concern the same topic," the document characterization algorithm uses a word n-gram weighting method. The method has the same problem seen in Patent '235. If the second party rearranges the message, the message characterization mechanism fails.

In U.S. Pat. No. 5276869, entitled "System for selecting document recipients as determined by technical content of document and for electronically corroborating receipt of document," creates profiles of documents for matching against profiles of documents of interest to a potential receiver. However, the method assumes a limited range of document types, specifically disclosures of inventions.

In U.S. Pat. No. 5701459, entitled "Method and apparatus for rapid full text index creation," a full text index creation algorithm is used. The method assumes no capricious or evasive reordering or rewording of text to evade searches.

In U.S. Pat. No. 5469354, entitled "Document data processing method and apparatus for document retrieval," a search method that breaks the document into shorter character strings that are used to build an index is used. However, the method is not sensitive to common phrases, and is an optimization technique for phrase-level searching, rather than a searching technique.

In U.S. Pat. No. 5107419, entitled "Method of assigning retention and deletion criteria to electronic documents stored in an interactive information handling system," varying criteria for deletion are suggested. However, the method requires user response and input, and is not automatic.

In U.S. Pat. No. 5613108, entitled "Electronic mail processing system and electronic mail processing method," documents are classified and located within a file system by attempting to automatically determine the type. However, the method assumes that the senders are not trying to subvert the classification system.

Generally prior art document classification approaches start from common assumptions about the motivations for content-based document search, index and retrieval. These motivations, found on the publishing side and on the consumption side, are listed below.

The indexing and search techniques reflect, for the most part, searcher subject-matter interests, and a desire to find a uniquely fitting subset of documents. Most prior art document classifications systems are not designed to avoid unsolicited documents, or to determine whether or not a given document is truly unique.

Generally, the information provider, out of concern for managing costs, maintaining profitability, and/or maintaining a reputation for courtesy, strongly desires that the document reach only interested audiences. The information provider therefore uses the automatic indexing service to improve the chances of the document being automatically identified by such audiences. Generally, the information provider is not interested in providing many copies of the document with insignificant variations, automatically or otherwise. Such copies could be taken by searchers as frivolous reproduction of essentially the same information, a cost in consumer time, and would require resources, such as disk space, that the publisher has to pay for.

Generally, prior art document classification systems assume that the documents have relatively little time-value, in the sense that they are expected to be stored for purposes of retrieval for periods of years, and usually need not be indexed, promoted, and propagated immediately. While a timely response from the search and retrieval system is important for attracting and retaining users, there is no real-time response requirement, especially for generating document indexes. Most such systems need not index documents before some real-world event in order to be of real value to information providers and their client searchers.

Document source text with original information is assumed to be produced at human input rates. Usually prior art document search systems assume that there is a desire to make the documents available on networks and in computers using only the amount of redundancy needed for information integrity and user convenience.

There is an advantage to both publishers and searchers in using indexing schemes that are standard, consistent, and independent of time of search and particular physical repository. Indexing techniques that are opaque and variable according to time and place would defeat the purposes of interested parties. Indexing systems for document retrieval systems must be highly reliable, as a basic measure of their quality- of-service. In general, people would distrust a system that provided them with different, and incorrect, results at different times or from different sites, even occasionally.

Prior art on-line document retrieval systems still largely assume limits in both computer power and network bandwidth. The algorithms and technology still reflect these prevailing assumptions. In particular, since power and bandwidth resources were scarce, closed, and closely held, there was a low tolerance for conspicuously frivolous uses of them.

Since that time, however, dramatic improvements in computer power and network bandwidth have weakened a number of the above assumptions. The digital "information explosion" was made possible by the rapid growth of secondary storage, processing power, and public networking. But it has been followed by several kinds of "information pollution." Computers can duplicate and propagate information much more cheaply and quickly than human beings. This has always been true, of course, but it has not been until recently that these virtues have been inexpensive enough to also provide opportunities for people to inconvenience others.

In particular, there is now information in, or appearing via, computers that concerned parties can not easily avoid, however much they might wish to. Such information is unlikely to be efficiently indexed in any database. Some promoters wishing to reach interested audiences have found ways to actively present information to many people. They show little concern for the large numbers of uninterested parties they also reach in the process. An example of this is the embedding of popular-but-irrelevant keywords in invisible text on web pages, to increase hit ratios.

One prior art method of filtering "information pollution" is by comparing every suspect message word for word against a list of messages thought to be undesirable. Such an approach can, however, be easily frustrated by automating the production of minor changes to the text. Such changes might include changing the order of phrases, sentences and paragraphs, without changing their meaning. Such permutations can be made at a cost not significantly greater than that required for simply copying the text. Only a small amount of extra text preparation effort and simple software tools are required. Given motives to do so, text permutation is an obvious and easy step for those determined to reach audiences that are employing naive content-matching filters to reduce such material.

Since much of the information that constitutes "information pollution" is of little value compared to the time and resources consumed in propagating it, and these costs are not borne by the information providers for most part, the information typically has only time value, if any. Long term storage in databases is not a goal for its propagators.

Another prior art system indexes documents for active searches by interested users. However, such indexing can delay recently-received material. With "information pollution," the information source is typically intrusive or obstructive, since undesired information is often not immediately distinguishable from desired information. Therefore, indexing is not viable. Filtering of such information requires "real time" response—response within a short amount of time.

Existing document indexing, storage, and retrieval systems are designed under assumptions that are almost directly the opposite of any system that might be used to ameliorate "information pollution" problems.

OBJECTS AND SUMMARY OF TIE INVENTION

It is an object of this invention to provide a fast indexing and matching mechanism for documents.

It is a further object of this invention to defeat attempts to evade matching by trivially reordering the text of the message.

It is yet another object of this invention to defeat attempts to determine the textual characteristics being used for indexing of text, to frustrate attempts to evade matching.

A document indexing mechanism is described. A first document is parsed into elements, and a deterministic pseudo-random score is calculated for at least some of the elements. A subset of the scores is selected based on the values of the scores. The subset of the scores is used as multiple indexes into a database of documents.

For one embodiment, the indexing mechanism is also used for searching. For this embodiment, at least a subgroup of the score values calculated are compared to stored values corresponding to known documents. The process indicates that the document is not in the database if no matches are found. If at least one match is found, the plurality of elements of the candidate document are compared with elements of the known documents. Based on this comparison, it is determined whether or not the document is in the database.

Other objects, features, and advantages of the present invention will be apparent from the accompanying drawings and from the detailed description that follows below.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A method and apparatus for a document indexing mechanism is described. The document indexing mechanism is designed for a user, who passively receives or holds a large quantity of messages. The user wishes to automatically provide a large amount of search information to be used to determine whether some of the documents are undesirable, duplicates, or otherwise identifiable.

The mechanism described below may be deployed as a filtering mechanism to weed out unsolicited messages. These unsolicited messages are sent deliberately by information polluters. Information polluters are willing to send large quantities of messages to a generally uninterested audience, in order to contact a few potentially interested people.

A document indexing scheme that is opaque, location-dependent, and time-varying is useful if the "information polluters" attempt systematic evasion of indexing, beyond even the effort to evade filters that can detect textual permutations. In the case of "information pollution," perfect reliability is a secondary concern. A certain small amount of pollution can be tolerable in almost all cases. Reliability may be decreased for lower costs, faster indexing, or for other service enhancements. This represents an advantage over schemes that do not have such flexibility.

Figure 1:
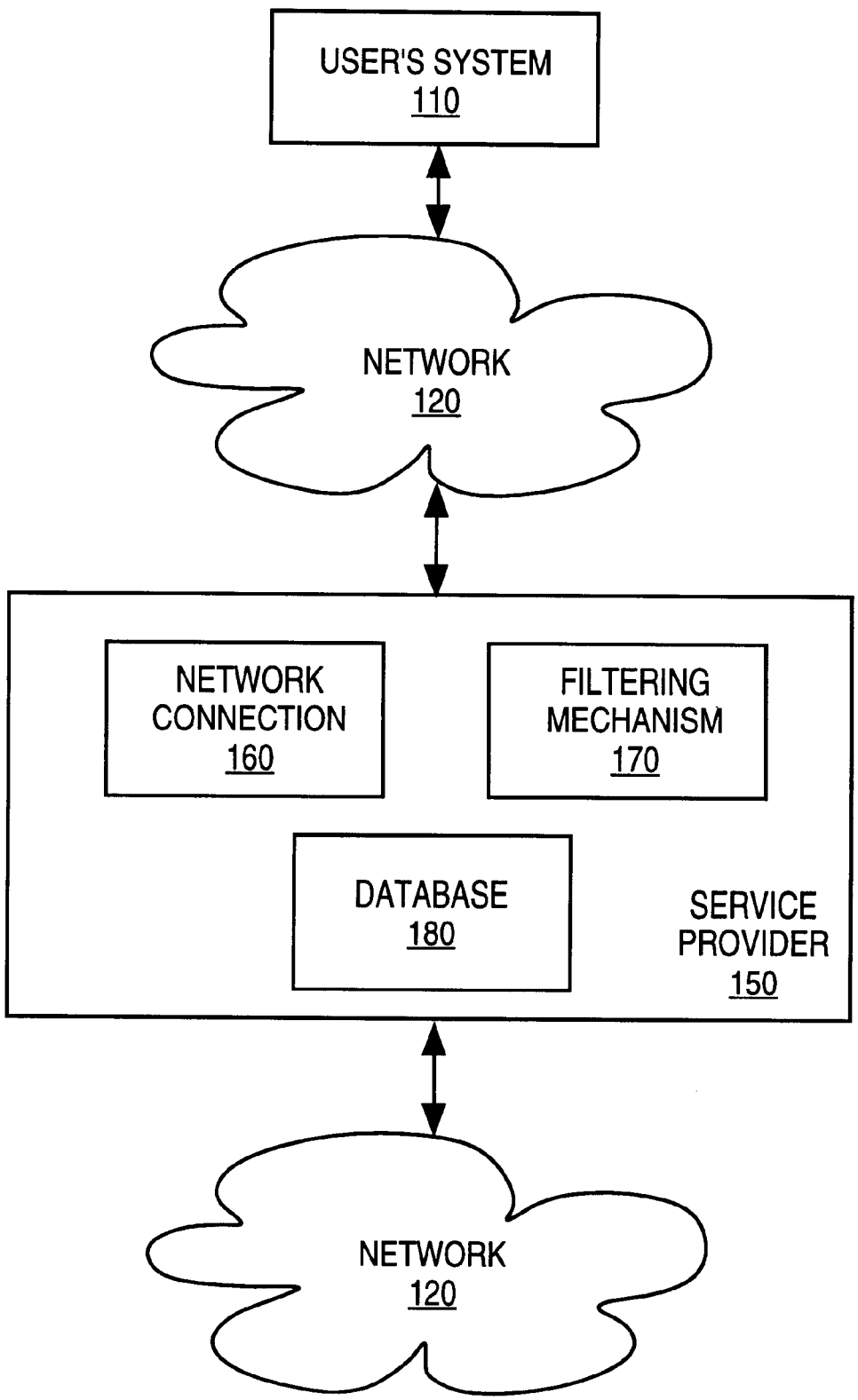
FIG. 1 illustrates a network in which the present invention may be implemented.

FIG. 1 illustrates one embodiment of a network over which the present invention may be implemented. The user's system 110 is a client system. For one embodiment, the user's system is a computer system, as will be described below. Alternatively, the user's system may be a dumb terminal, a public access client, a kiosk, etc. The user's system 110 is coupled to a service provider 150 via a network 120. The service provider 150, or Internet Service Provider (ISP) 150, provides the user's link to the Internet. For one embodiment, the ISP 150 may be a commercial ISP 150 such as America Online ™ of Dulles, Vir. For another embodiment, the ISP 150 may be any link to the Internet.

The service provider 150 includes a network connection 160, and permits the user's system 110 to connect to other sites via the network 120.

For one embodiment, the service provider 150 further includes a message filtering mechanism 170 which receives messages directed to the user 110. Prior to passing these messages to the user 110, the message filtering unit 170 filters out messages that are undesired or redundant.

The service provider 150 further may include a database 180. The database stores the messages and indexes generated, as discussed below. For one embodiment, the database may be stored on a different system from the filtering mechanism 170. For one embodiment, the database 180 may be on the user's system 110. For another embodiment, the database 180 may be present when there is no filtering mechanism 170. This would permit the use of this system for indexing documents, without filtering such documents from a user's system 110.

For one embodiment, the filtering mechanism 170 and database 180 are not within the service provider 150, but rather within the user's system 110. For one embodiment, the filtering mechanism 170 of the present invention may be implemented throughout the entire Internet. In that case, the filtering mechanism 170 and database 180 may be distributed through multiple systems coupled to the Internet.

Figure 2:
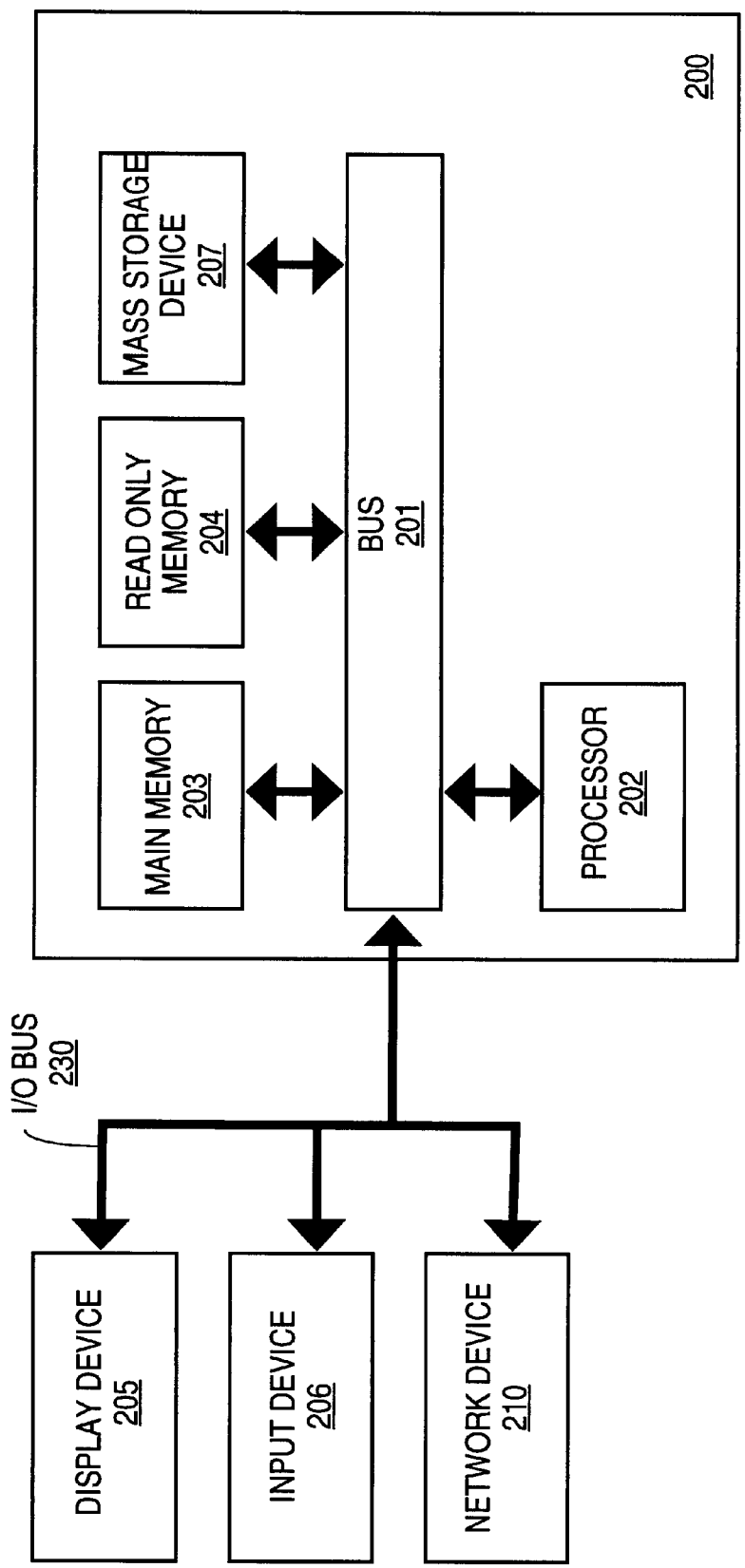
FIG. 2 illustrates a computer system on which the present invention may be implemented.

FIG. 2 is a block diagram of the computer system 200 in which an embodiment of the present invention can be implemented. Computer system 200 comprises a bus 201 or other communication means for communicating information, and a processor 202 coupled with bus 201 for processing information. Computer system 200 also comprises a read only memory (ROM) and/or other static storage device 206 coupled to bus 201 for storing static information and instructions for processor 202.

The computer system 200 further comprises a main memory 203, a dynamic storage device for storing information and instructions to be executed. Main memory 203 also may be used for storing temporary variables or other intermediate information during execution of instructions. For one embodiment the main memory 203 is dynamic random access memory (DRAM).

Computer system 200 can also be coupled via I/O bus 230 to a display device 205, such as a cathode ray tube (CRT) or liquid crystal display (LCD) screen, for displaying information to a computer user. An input device 206 is typically coupled to I/O bus 230 for communicating information and command selections to processor 202. Input device 206 may be an alphanumeric input device such as a keyboard. Another type of user input device 206 is a cursor control device 206, such as a mouse, a trackball, trackpad, or cursor direction keys for communicating direction information and command selections to processor 202 and for controlling cursor movement on display device 205. Alternatively, other input devices 206 such as a stylus or pen can be used to interact with the display. Multiple input devices 206 may be coupled to the computer system 200.

The computer system 200 may further be coupled via the I/O bus 230 to a network device 210 for communicating with other computers. The network device 210 may be a modem, a network card, or other device to communicate between the computer system 200 and other systems or networks. Alternatively, these devices may be coupled to the computer system 200 via a the main bus 201 or a PCI bus.

For one embodiment, the computer system 200 includes software including a mail agent. The mail agent is designed to connect to the ISP 150, and receive messages directed to the user.

Figure 3:
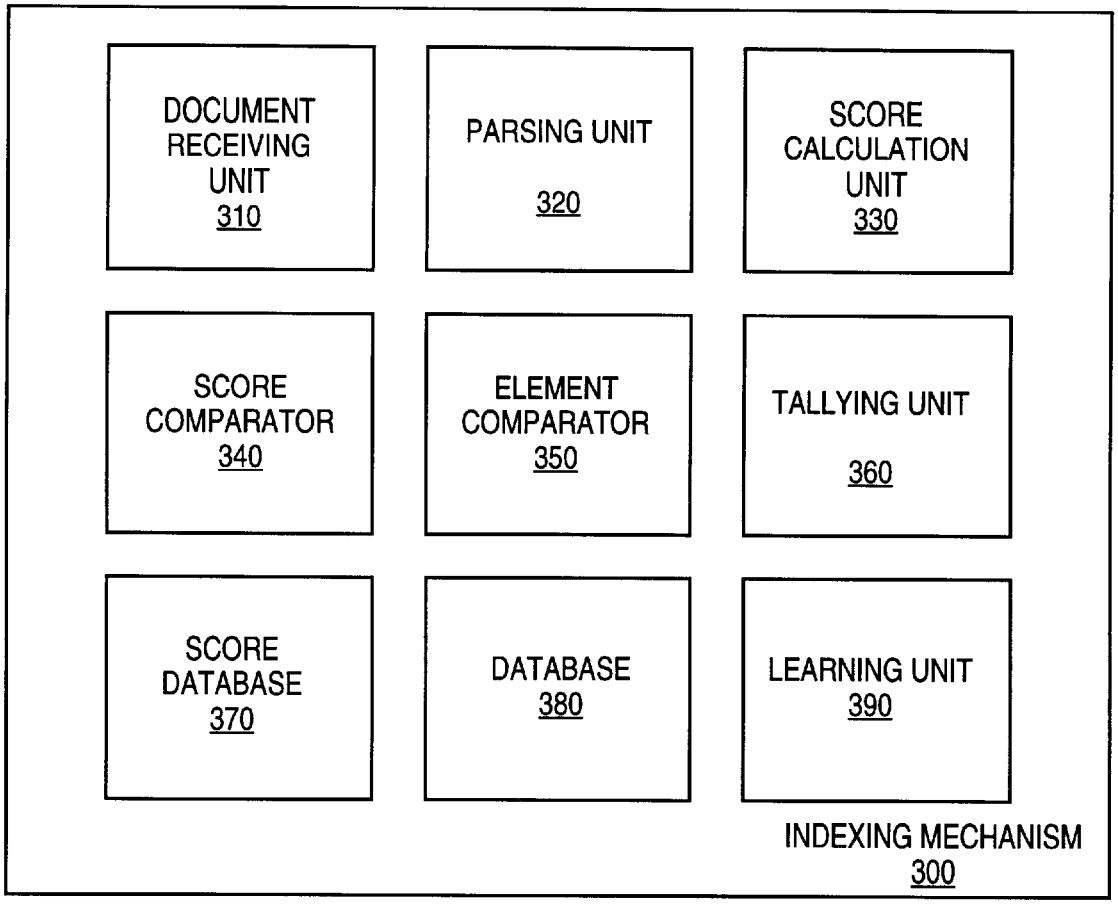
FIG. 3 illustrates a block diagram of one embodiment of the present system.

FIG. 3 illustrates a block diagram of one embodiment of the indexing unit 300 of the present invention. The indexing unit 300 includes a document receiving unit 310. For one embodiment, the document receiving unit 310 corresponds to an "in" box for a user. When the user receives a message in his or her in-box, the indexing unit 300 is activated.

The document receiving unit 310 passes the document to a parsing unit 320. The parsing unit 320 parses the document into multiple elements. For one embodiment, the parsing unit 320 parses the document into three word phrase sequences present in the document. Thus, a document having n words (0123456789) is parsed into n-2 (012, 123, 234, 345, 456, 567, 678, 789) elements.

For example, the document: "This is a test message to test a parsing unit" would be parsed into eight elements: "this is a"; "is a test"; "a test message"; "test message to"; "message to test"; "to test a"; "test a parsing"; "a parsing unit." For an alternative embodiment, "common terms" such as a, the, and, etc. are removed from the document prior to parsing. Thus, the test document would have the following elements "this is test"; "is test message" "test message test"; "message test parsing"; "test parsing unit". For another embodiment, the parsing unit parses the message into two-word, four-word, or five-word elements.

For one embodiment, the parsing unit 320 only parses a part of the document. For example, the first 64 kilobytes of the documents may be selected for parsing and storing, and the remainder discarded. This is advantageous to save space in the database, if multiple large documents may be received. The parsing unit 320 passes these elements to a score calculation unit 330.

The score calculation unit 330 calculates a score of each of the elements. The score calculation unit 330 is a deterministic pseudo-random number generator. The pseudo-random number generator generates scores having an even distribution over all input values. For one embodiment, the score calculation unit 330 uses a function of the element as its seed, and generates one random number per element. For one embodiment, the seed used is a cyclic redundancy check (CRC) function of the element. For another embodiment, the seed is a checksum function of the element. The list of the scores of the elements is passed to a score comparator 340. For one embodiment, the score calculation unit 330 selects a subset of the scores for further processing. For one embodiment, the pseudo-random number generator is a CRC function.

The score comparator 340 compares the scores calculated by the score calculation unit 330 to indexes to the database 370. The score comparator passes document identifications (IDs) corresponding to the scores that were matched to the element comparator 350. This is described in more detail with respect to FIG. 4 below.

The element comparator 350 compares the elements of stored documents with the elements of the current document. The element comparator 350 retrieves stored documents corresponding to the document IDs from the document database 380. The retrieved documents are compared to the current document, to test whether they correspond. The tallying unit 360 tallies this comparison, to determine whether the correspondence is sufficiently close to declare a match.

For one embodiment, the output of the tallying unit 360 is used by the indexing unit 300 for further processing. For one embodiment, if the output of the tallying unit 360 indicates that the current document corresponds to a document in the document database 380, the current document is deleted from the user's system. For another embodiment, the indexing unit 300 may use this information in other ways.

The indexing unit 300 further includes a learning unit 390. The learning unit 390 is used to add documents to the document database, as well as scores to the score database. Some exemplary implementations of the learning unit are described below with respect to FIGS. 6 and 7.

Figure 4:
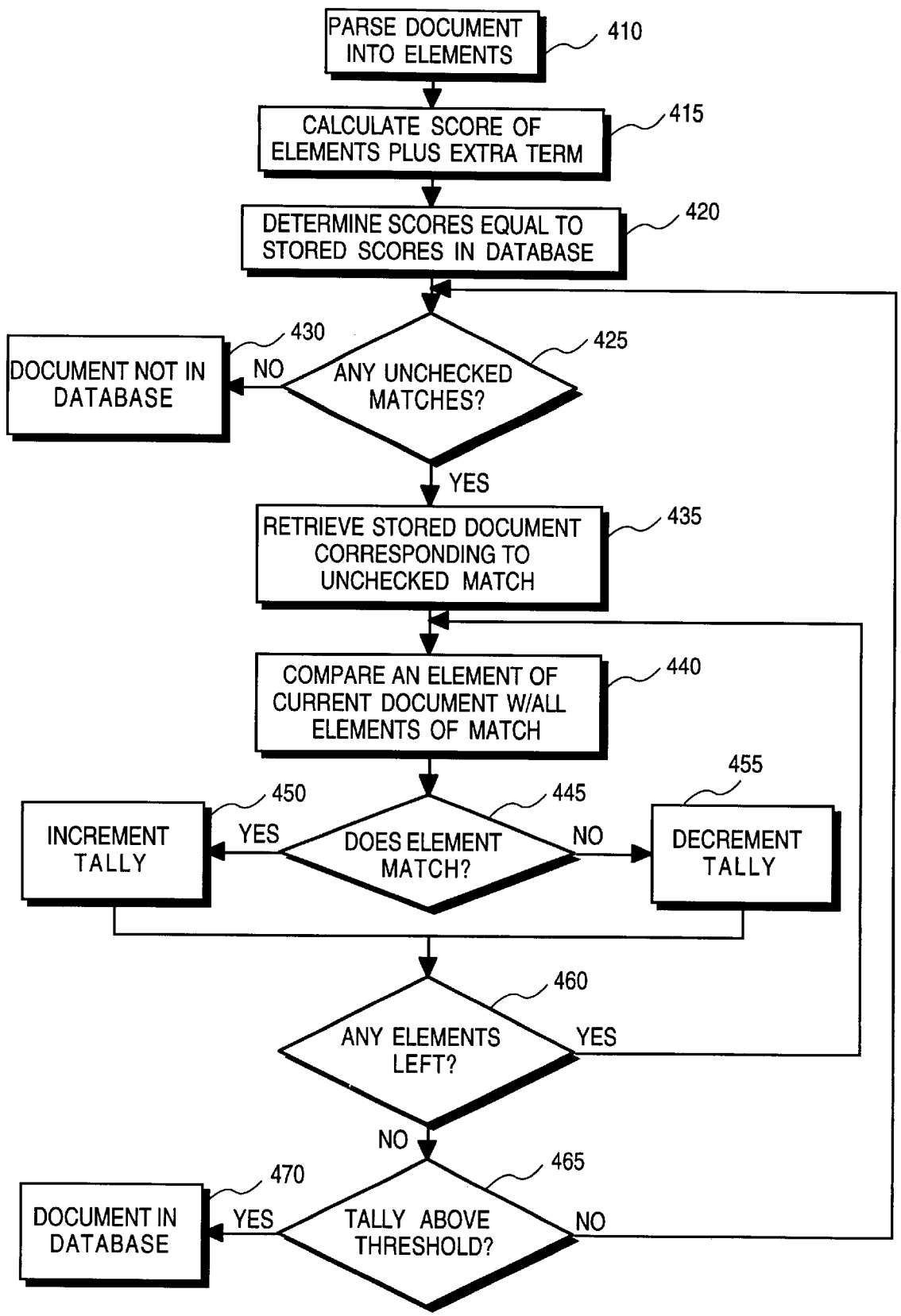
FIG. 4 illustrates a flowchart of one embodiment of the mechanism of the present invention.

FIG. 4 illustrates one embodiment of the method of the present invention. The process starts when a document is received. For one embodiment, the document is a message received by a mail agent, and passed to the filtering system.

At block 410, the document is parsed into elements. For one embodiment, the document is parsed into three word elements. Thus, for example, the document may be A B C D E F G, where each of the letters stands for a word in the document. The parsing may result in the three word elements of ABC, BCD, CDE, etc. In this way, every three-word sequence is presented. For an alternative embodiment, the elements may include a different number of words. For another embodiment, the parsing may include a step of removing connecting words, such as 'a, an, the, of', etc. Then, the parsing divides the remaining document as described above. For one embodiment, only part of the document is parsed, while the remainder of the document is discarded. For one embodiment, the same part of the document, for example the first 64 K, is parsed for each document.

At block 415, a score of the elements is calculated. The score is a deterministic pseudo-random score having an evenly distributed output across all inputs.

For one embodiment, only the X scores having the highest values are used in further processing. X may be any number, up to the number of scores calculated. However, generally X is a number between five and twenty. For one embodiment, the selection of the value of X is consistent within one system. That is, if ten scores are selected for one document on a system, then all other documents also have ten scores selected.

One example of determining those highest values is as follows. Initially a first set of X scores are calculated. Then, the lowest score is determined. The next score is calculated, and if the next score is greater than the lowest score, the next score replaces the lowest score. This process is repeated until the X scores having the highest values have been found. Alternately, the X scores having the lowest values may be similarly determined.

Returning to block 415 of FIG. 4, for one embodiment, a constant is added to or combined with each element prior to calculating the score. For one embodiment, the constant may be a term such as the Internet Protocol (IP) address of the server system that holds the document database, a host name, etc. The constant may be determined on a system by system basis. However, the constant should be consistent across each individual system. That is, all documents coming to a specific system should have the same constant. The constant serves to make the selection of the X scores unpredictable. This is advantageous if a third party is attempting to avoid identification of a message.

At block 420, the scores are compared with stored data in the database. These scores are used as an index into the document database. That is, each document in the database is indexed according to its scores. As described above, the process is attempting to match a new document, or candidate document, to a database. A more detailed description of the matching process of blocks 420 and 425 are described in FIG. 5. At block 425, the process tests whether there are any untested matches.

If no untested matches remain at block 425, the process continues to block 430. At block 430, it is determined, that none of the scores in the database correspond to the score being tested. Generally, this means that the current document does not correspond to any of the stored documents. However, in some instances, a false negative reading may be given. This is tolerable in most circumstances. Having such a probabilistic matching speeds up the matching process. If an untested match remains, the process continues to block 435.

At block 435, the stored document corresponding to the matched score is retrieved. For one embodiment, the document itself is retrieved, and then parsed into elements. For another embodiment, the elements are retrieved, and no parsing is necessary.

At block 440, an element of the current document is compared to each of the elements of the retrieved document.

At block 445, the process tests whether the element is matched with any of the elements of the retrieved document. If the element matches, the process continues to block 450, where a tally is incremented. If the element does not match, the process continues to block 455, where the tally is decremented. The tally is cumulative for each matched document. For one embodiment, the tally is initially zero, and each increment and decrement is an increment/decrement by one. Both block 450 and 455 continue to block 460.

At block 460, the process tests whether there any more untested elements. For one embodiment, in order to prevent a smaller document from being matched with a dissimilar larger document, the comparison is in both direction. That is, the comparison is first is in one direction, i.e. elements of the current document compared to the stored document, and then in the other direction, i.e. elements of the stored document compared with elements of the current document. Thus, untested elements remain until both sets of elements are compared with each other.

If untested elements remain, the process returns to block 440, where the next element is compared to each of the elements of the retrieved document. If no untested elements remain at block 460, the process continues to block 465.

At block 465, the process tests whether the tally is above a threshold. For one embodiment, the threshold may be varied depending on the tolerance for errors. That is a higher tally is set if a false negative is preferred to a false positive. For one embodiment, the tally is a number, such as 10. For another embodiment, the tally is a ratio of the number of total elements and the number of elements matched. Thus, for one embodiment, the threshold is defined as 75% of the elements match.

If the tally is above the threshold, the process continues to block 470. At block 470, it is determined that the document has been found in the database. If the tally is below the threshold, the process returns to block 430. At block 430, it is again determined whether there are any untested documents. Note that the tally is reset between each document comparison.

This process allows a candidate document to be tested to determine whether the candidate document corresponds to one of the documents in the database.

Figure 5:
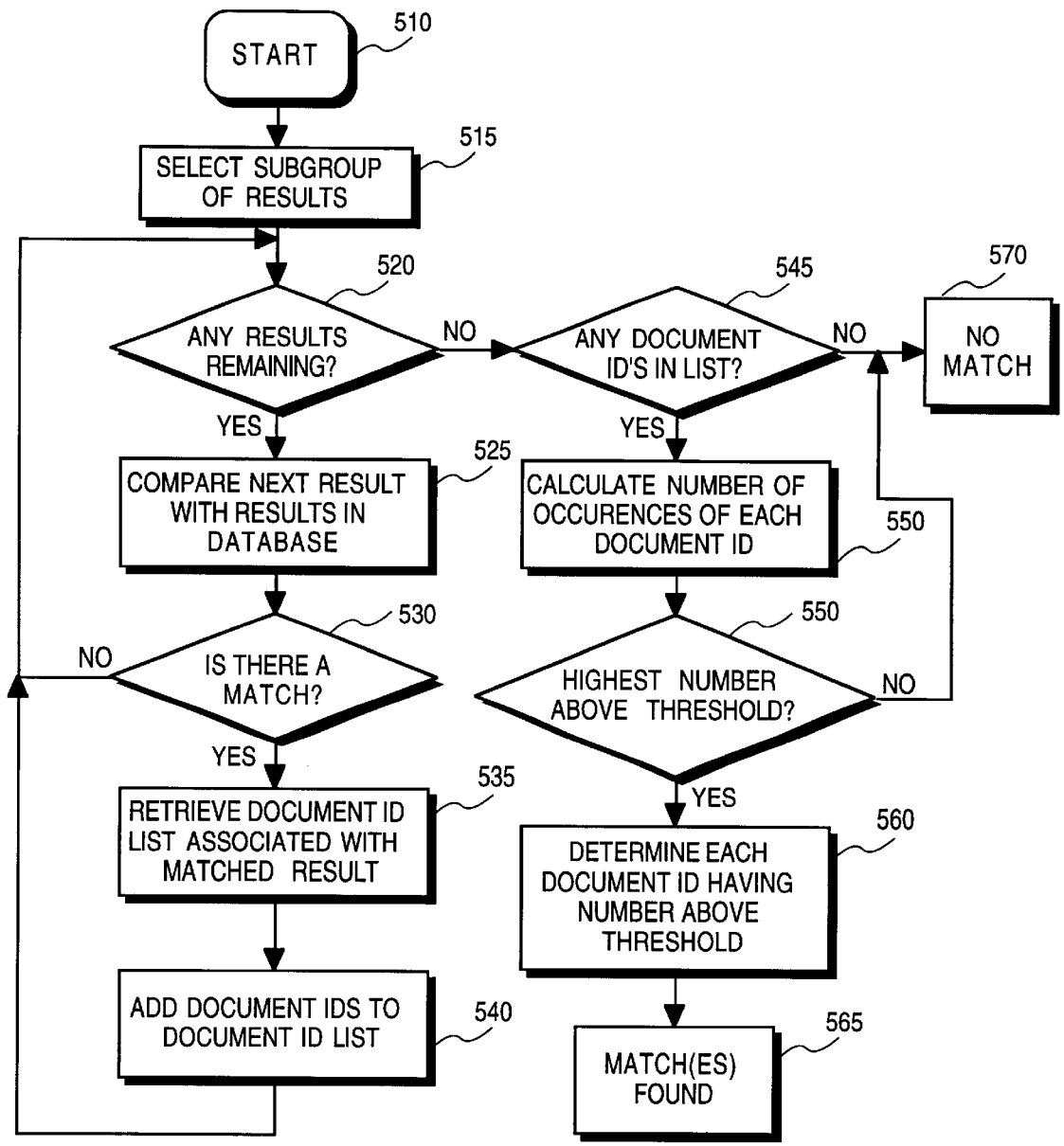
FIG. 5 illustrates a flowchart of one embodiment of determining whether a document is already in the database.

FIG. 5 illustrates in more detail one embodiment of the step of determining whether the scores of the current document match any of the stored scores of the documents stored in the database. The scores are an index to the database of documents.

At block 510, the process starts. For one embodiment, this process starts after scores of each of the elements of the candidate document have been calculated.

At block 515, a subgroup of the current scores is selected. For one embodiment, the subgroup of scores is a number of scores with the highest score. For another embodiment, the subgroup is a number of scores with the lowest value. For one embodiment, ten scores are selected.

At block 520, the process tests whether there are any current scores remaining in the selected subgroup. For one embodiment, after a score is compared for matching, the score is discarded. Therefore, this step tests whether all of the current scores in the selected subgroup have been compared for matching. If any current scores remain, the process continues to block 525. If no scores remain, the process continues to block 545.

At block 525, the current score (i.e. the score resulting from the CRC function of the element) is compared with the stored scores in the database. For one embodiment, the database includes a list of stored scores. Each of these stored scores corresponds to a document identification list including at least one document. Therefore, the score in the database is an index to the associated documents. For example, the entry in the database may be: 73, ID-4, ID-78. In this example, the stored score, or index, is 73, and two documents, having the document identifiers of 4 and 78, are indexed by this score, among others.

At block 530, the process tests whether the current score matches any of the stored scores. For one embodiment, this is a standard numeric comparison, testing for identity. If no matches are found for the current score tested, the process returns to block 520. At block 520, the process determines whether any more current scores remain to be matched. If a match is found, the process continues to block 535.

At block 535, the list of document identifiers (IDs) indexed by the score is retrieved from the database. At block 540, the document IDs are added to a document ID list. For one embodiment, the document ID list is a list of document identifiers, and the number of times the identifiers occurred. Thus, for example, after a number of comparisons, the document ID list may be as follows: 34, 94, 28, 34, 99, 28.

From block 540, the process returns to block 520, testing whether there are any more current scores to be matched. If no more current scores remain, the process continues to block 545.

At block 545, the process tests whether there are any document IDs in the document ID list. If no matches were found during the test, no document IDs are in the list. If no document IDs are in the list, the process continues to block 570, determining that there is no match. For one embodiment, this information is returned at block 425 of FIG. 4. Returning to FIG. 5, if there is at least one document ID in the document ID list, the process continues to block 550.

At block 550, the number of occurrences for each document ID in the document ID list is calculated. For one embodiment, for the list described above—34,94, 28, 34, 99, 28, 29—the new list would be 34 (2), 94(1), 28(3), 99 (1).

At block 555, the process queries whether the highest number of occurrences is above a threshold. The threshold is a minimum number of occurrences of the document ID for a match. For one embodiment, the threshold is three. If the highest number is not above the threshold, the process continues to block 570. At block 570, it is determined that there is no match. If the highest number is above the threshold, the process continues to block 560.

At block 560, each document ID that occurs more often than the threshold is identified. In the example given above, this would result in a list including only ID 28. A larger number of document IDs may be on the list.

At block 565, it is determined that there is at least one match. The document IDs occurring at least as many times as the threshold number are returned to the process of FIG. 4. The process of FIG. 4 then uses the documents identified by the list of document IDs for further processing.

Figure 6:
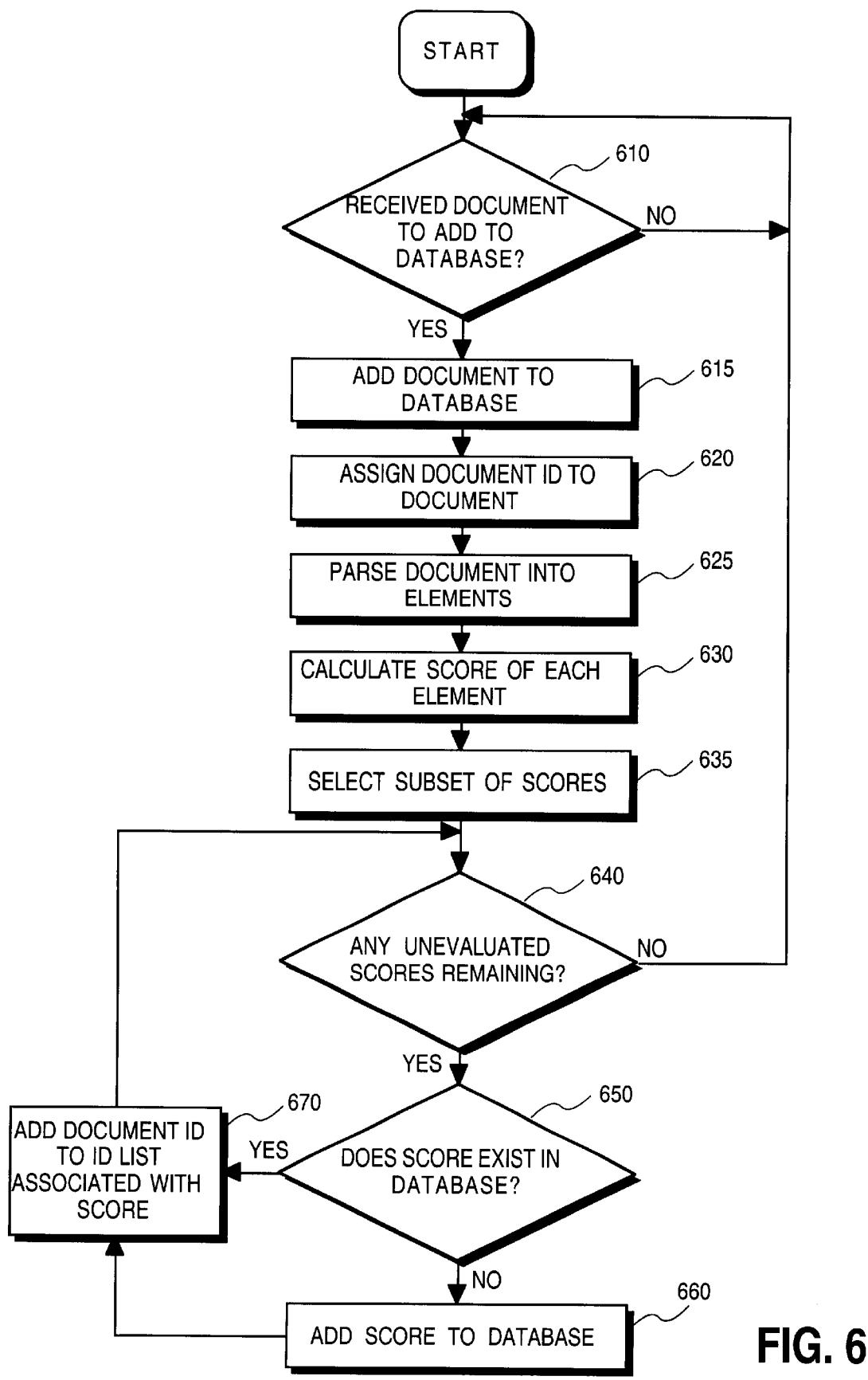
FIG. 6 illustrates a flowchart of one embodiment of adding a document to the database.

FIG. 6 illustrates one embodiment of a learning process. At block 610, a document to be added to the database is received. This document may be received from a variety of sources. For example, a user may indicate that a document should be added to the database. For another embodiment, target addresses designed to draw messages to be added to the database may be distributed. Messages sent to these target addresses would be automatically added to the database.

For one embodiment, all messages received are added to the database, and each time a duplicate message is received, a counter associated with that message is incremented. Message filtering is done based on the values of the counters associated with the messages. One implementation of this process is described in FIG. 6.

At block 615, the message is stored in the database. For one embodiment, the message is stored in a separate message database containing the full messages only. For another embodiment, the message is stored further indexed by the score. For one embodiment, the full message is stored. For another embodiment, only part of the message is stored, and used in further processing. For one embodiment, the part of the message is between one kilobyte and one megabyte in size. For one embodiment, the part of the message is two to the sixteenth in size, or 65,536 bytes.

At block 620, a message identifier (ID) is assigned to the message. This message ID is a unique identifier that is associated with the message. For one embodiment, the message identifier is number string. The message identifier also includes a pointer to the location where the message is stored.

At block 625, the message is parsed into elements. This parsing uses he same process as the parsing described above with respect to FIG. 4. For one embodiment, the parsing is into three-word elements, such that each three word phrase of the message is represented.

At block 630, a score is calculated for each element of the message. Again, the same method as described above is used. The score is a pseudo-random score having an even distribution over the possible elements.

At block 635, a subset of the scores is selected. For one embodiment, this subset may include all of the scores. Alternately, a set of score having a specific characteristic may be chosen. For example, a subset of scores having the highest or lowest values may be chosen. For one embodiment, ten scores are chosen.

At block 640, the process tests whether any unevaluated scores remain. The scores are evaluated as described below. After all scores have been evaluated, the process returns to block 610, and waits to receive the next message to be added to the database. If at least one unevaluated score remains, the process continues to block 650.

At block 650, the process tests whether the score exists in the database. Each score found in a message is added to the database. For one embodiment, the score is a two-digit number. Thus, the process tests whether the two-digit number corresponding to the score calculated for the current element already exists in the database. If the score does not exist in the database, the process continues to block 660. At block 660, the score is added to the database. The process then continues to block 670. If the score exists in the database, the process moves directly to block 670.

At block 670, the message ID is added to the ID list associated with the score. Each score in the database has at least one message ID associated with it. Generally, a score may appear as follows: 46: ID-4567, ID-9870, ID-3491. The score itself has a value of 46, and three messages, with the IDs 4567, 9870, 3491, are associated with that score. Once the message ID has been added to the list of IDs associated with the score, the process returns to block 640, to query whether any unevaluated scores remain. In this way, each message is assigned a message ID, added to the message database, and to a number of message ID lists, and indexed according to the selected scores.

Figure 7:
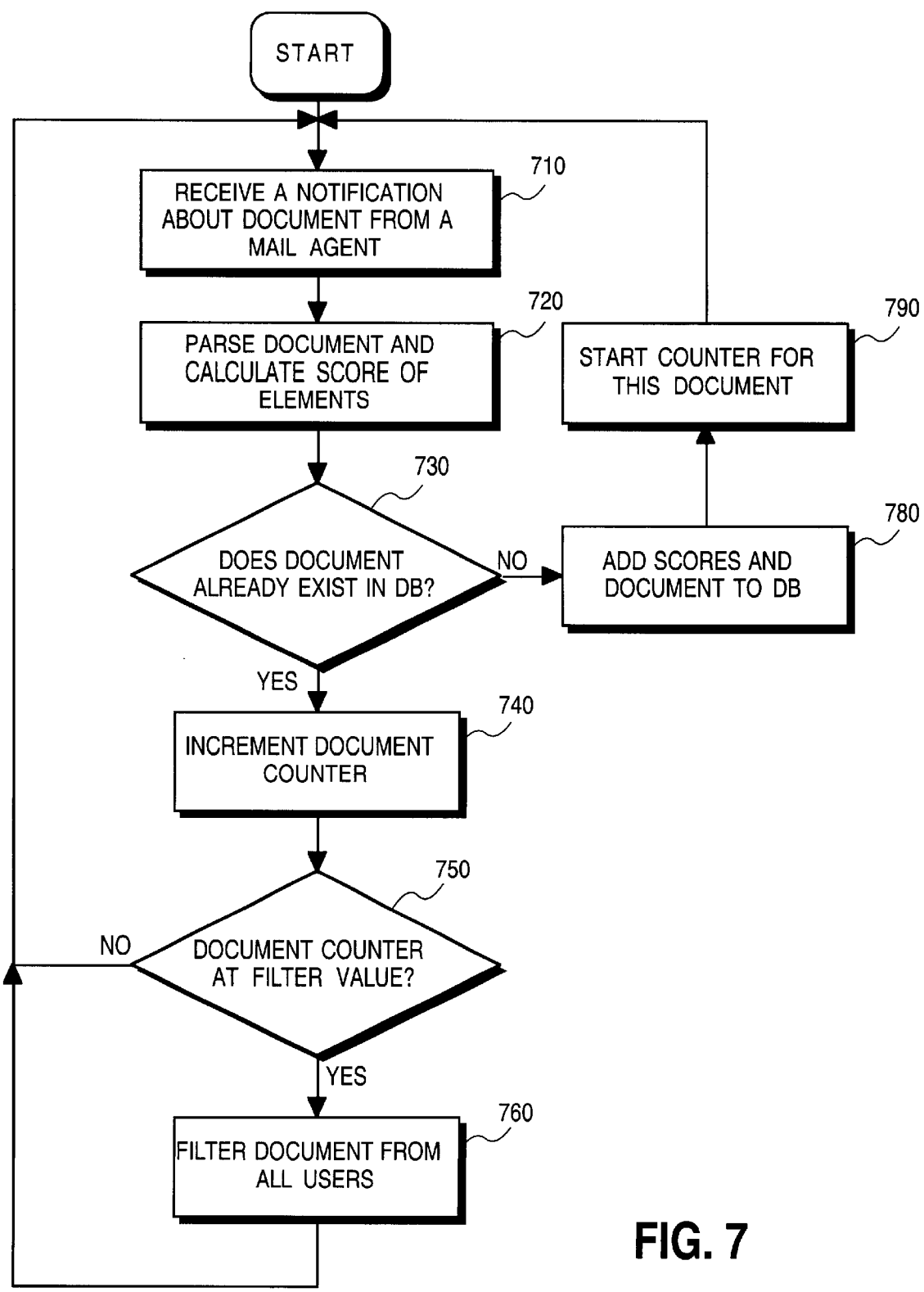
FIG. 7 illustrates a flowchart of one embodiment of the learning mechanism of the present invention.

FIG. 7 illustrates another embodiment of a learning process. At block 710, a notification is received about a document. For one embodiment, the notification is from a mail agent about a message. For one embodiment, at least one mail agent of at least one user includes a notification button. The notification button is designed to inform the service provider that the message is not wanted by the user. For one embodiment, this button may be labeled "filter" or a similar label. When the user opens a document, or selects a document, and selects the filter button, the mail agent automatically deletes the message from the user's mailbox, and further sends a notification to the filtering system of the present invention. For one embodiment, the notification received includes the message in its entirety.

At block 720, the message is parsed into elements, and scores of those elements are calculated. These processes are described above in more detail with respect to FIG. 4. For an alternative embodiment, this step may be skipped.

At block 730, the process tests whether the message already exists in the database. For one embodiment, the process described with respect to FIG. 5 is used. Alternatively, since identical messages are being searched for, a simple comparison of the body of the message to messages already in a message database is used. If the message is found not to be in the database, at block 730, the process continues to block 780.

At block 780, the scores and message are added to the database. For an alternative embodiment, only the message may be stored, without storing the scores. For one embodiment, the full message is stored. For another embodiment, only part of the message is stored, and used in further processing. For one embodiment, the part of the message is between one kilobyte and one megabyte in size. For one embodiment, the part of the message is two to the sixteenth in size, or 65,536 bytes.

At block 790, a counter is started for the message. A counter is initially set to 1, indicating that one message has been received. The process then returns to block 710, and waits for another notification from a mail agent.

If, at block 730, the message was found in the database, the process continues to block 740. At block 740, the message counter for the message is incremented by one. This indicates the number of copies of the message received from mail agents.

At block 750, the process tests whether the message counter has reached a filter value. The filter value may be set by the service provider. For one embodiment, the filter value depends on the number of users on the system. For example, if more than 5% of users indicate that the message should be filtered, the filter value may be reached.

If the filter value was not reached, the process returns to block 710. If the filter value was reached, the process continues to block 760. At block 760, the message is filtered from all users. For one embodiment, this includes testing the mail boxes of all users, and automatically removing the indicated message from all mail boxes in which they exist. For another embodiment, the step of filtering comprises automatically moving the messages into a separate folder on the user's system. For example, a separate "filtering" mailbox may be created for such messages.

In this way, if a number of users indicate that a message should be filtered, it is filtered from all users. For one embodiment, the mail agent may be Internet-wide. For one embodiment, a specific filtering protocol may be implemented incorporating the methods described above to solve the problems of unwanted messages.

An alternative use of the system described above may be to compare two documents for substantial identity. This may be useful for teachers trying to find cheating, for copyright owners trying to determine copying, and for similar uses. Alternative uses of such an indexing system that permits probabilistic matching may be found.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method comprising the steps of:

parsing at least a part of a first document into a plurality of elements, wherein the set of possible elements is large enough that multiple randomly-selected elements infrequently occur in unrelated documents;

calculating a deterministic pseudo-random score for each element;

selecting only a small subset of the scores based on values of the scores; and using the small subset of the scores as multiple indexes into a database of documents to be used to determine a match between the first document and another document, and discarding the remaining scores.

2. The method of claim 1 further comprising the steps of:

determining a match between the first document and a document in the database of documents using some or all of the subset of scores of the first document; and performing a comparison between each of the documents retrieved and the first document to determine if the first document is present in the database of documents.

3. The method of claim 2, wherein said step of performing the comparison comprises the steps of:

parsing at least part of the document retrieved from the database of documents into elements;

tallying how many elements exist in both the first document and the document retrieved, and how many exist in only one document;

obtaining a tally; and determining if the documents are substantially identical based on the tally.

4. The method of claim 2 further comprising the steps of:

selecting a second subset of scores based on the values;

adding the second subset of the scores to the index of the database of documents; and adding the first document to the database of documents.

5. The method of claim 4 wherein the first subset and the second subset are identical.

6. The method of 2 further comprising the step of:
identifying the first document as present in the database if there exists in the database a document that compares as substantially identical to the first document and is indexed by at least one score that is also present in the subset of scores calculated for the first document.

7. The method of claim 1, wherein said step of parsing comprises the step of determining N-word sequences contained within the first document.

8. The method of claim 7, wherein N is three.

9. The method of claim 1, wherein said step of calculating a pseudo-random score uses a CRC function having an even distribution of values over all inputs.

10. The method of claim 1, wherein a constant is added to or combined with each element before the score is calculated.

11. The method of claim 10, wherein the constant is an Internet protocol (IP) address or name of a server system that holds the document database.

12. The method of claim 1, wherein the part of the first document that is parsed is the first Y bytes of the document.

13. The method of claim 12, wherein Y is between one kilobyte and one megabyte.

14. The method of claim 1, wherein the subset chosen is the M elements having a highest value.

15. The method of claim 14, wherein M is ten.

16. The method of claim 1, wherein the subset chosen is the M elements having a lowest value.

17. The method of claim 4, wherein the second subset has a different number of elements than the first subset.

18. A method comprising the steps of:
parsing at least part of a first document having a plurality of words into a first plurality of elements, each element including a plurality of words, adjacent elements sharing words;

parsing at least part of a second document into a second plurality of elements, each element having a plurality of words, adjacent elements sharing words;

retaining a subset of the first plurality of elements and a subset of the second plurality of elements;

tallying how many of the subset of elements exist in both documents and how many exist in only one document;

obtaining a tally; and determining if the documents are substantially identical based on the tally.

19. An apparatus comprising:
a parsing unit for parsing at least part of a first document into a plurality of elements, wherein the set of possible elements is large enough that multiple randomly-selected elements occur infrequently in unrelated documents;

a score calculation unit for calculating a deterministic pseudo-random score for each element and selecting a small subset of the scores based on values of the scores, the score calculating unit further to discard the remaining scores; and a document database including a plurality of documents and using only the small subset of the scores as indexes into the document database.

20. The apparatus of claim 19, further comprising:
retrieving documents from the document database using some or all of the subset of scores of the first document; and performing a comparison between each of the documents retrieved and the first document to determine if the first document is present in the document database.

21. The apparatus of claim 20 further comprising:
a learning unit for selecting a second subset of scores based on the values, adding the second subset of the scores to the index of the document database, and adding the first document to the document database.

22. The apparatus of 20 further comprising:
a tallying unit for identifying the first document as present in the database if there exists in the document database a document that compares as substantially identical to the first document and is indexed by at least one score that is also present in the subset of scores calculated for the first document.

23. The method of claim 18, wherein each of the words in the document starts an element.

24. The method of claim 18, wherein each two subsequent elements have at least one overlapping word that appears in both elements.

25. A method comprising the steps of:
parsing at least a part of a first document into a plurality of multi-word elements, adjacent elements sharing words;

calculating a deterministic pseudo-random score for each element;

selecting only a small subset of the scores based on values of the scores and discarding the remaining scores; and using the small subset of the scores as multiple indexes into a database of documents, to declare a match between the first document and another document.

* * * * *